H. B. JOHNSTON.
PISTON AND PISTON RING.
APPLICATION FILED JAN. 17, 1921. RENEWED MAY 18 1922.

1,422,273.

Patented July 11, 1922.

Inventor
Harry B. Johnston.

By Walter W. Burns
Attorney

UNITED STATES PATENT OFFICE.

HARRY B. JOHNSTON, OF SEATTLE, WASHINGTON.

PISTON AND PISTON RING.

1,422,273.  Specification of Letters Patent.  Patented July 11, 1922.

Application filed January 17, 1921, Serial No. 437,816. Renewed May 18, 1922. Serial No. 562,036.

*To all whom it may concern:*

Be it known that I, HARRY B. JOHNSTON, residing at Seattle, King County, Washington, a citizen of the United States, have invented certain new and useful Improvements in Piston and Piston Ring, of which the following is a specification.

This invention relates to pistons and piston rings and is particularly for use in engines wherein it is necessary or desirable to secure a tight seal between the piston and its cylinder wall during the movement of the piston in the cylinder.

An object of this invention is the provision of an improved piston and ring construction wherein a tight seal is maintained between the piston and the cylinder wall and so constructed as to prevent any slapping of the ring in its groove.

Another object of this invention is the provision of such a piston and ring construction which will also prevent the passage of fluids having tendencies to go in opposite direction in different portions of the cycle of the machine's operation.

This device is particularly adapted for use in internal combustion motors where it is desired to hold a relatively great pressure from one direction during the power stroke and a lighter pressure from the opposite direction during the suction stroke.

Referring to the drawings where a preferred embodiment of the invention is illustrated:

Figure 1:
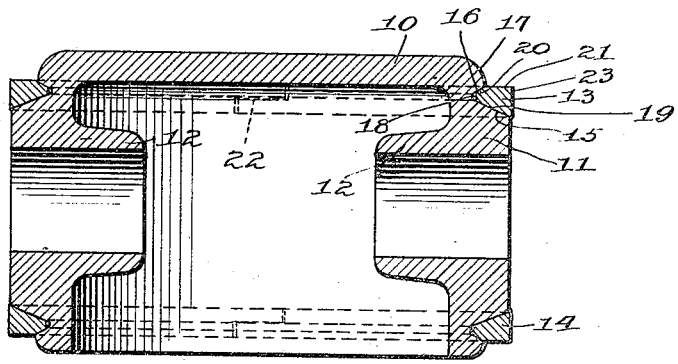
Figure 1 is a cross section of a piston showing two of my rings installed on opposite ends of a piston.
Figure 2:
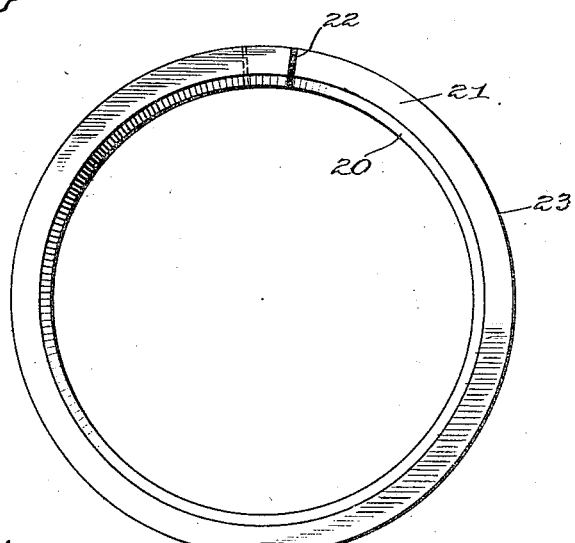
Figure 2 is a top plan view of the upper ring illustrated in Figure 1.
Figure 3:
Figure 3 is a side elevation of the ring partly broken away.

10 designates the head of a piston, 11 the side thereof and 12 designates bosses which may be provided for the wrist pins. At opposite ends of the piston are provided grooves in which are seated the rings 13 and 14 respectively.

The upper groove is provided with a conical wall 15 which inclines outwardly and away from the adjacent end of the piston. Opposite this inclined wall 15 is another but narrower inclined wall 16. The head of the piston terminates at the edge of the groove and short of the periphery of the piston as shown by the cut away portion 17. At the rear of the ring 13 in the groove may be a space 18 as for carbon when applied to the internal combustion motor.

The ring 13 is provided with an inclined surface 19 which is conical and similar in inclination to and contacts with, the inclined conical wall 15 of the groove. Another inclined conical surface 20 is provided, on the ring, of inclination similar to the inclined wall 16 and in contact therewith. Adjacent the inclined surface 20 on the ring is a surface 21, which is substantially in a plane. By this construction the bearing surface on the cylinder is reduced in proportion to the width of the ring radially and the ring does not have any flat bearing surfaces.

The ring is provided with a suitable split as the step joint 22.

Since the operation of the ring 13 is the same as the operation of the ring 14 when the pressure is coming from the opposite direction, and since under certain conditions it might be desirable to omit the ring 14 entirely, only the operation of the ring 13 will be described in this specification.

When the pressure adjacent the head 10 of the piston encounters the face 21 of the ring 13, the ring is forced outwardly and away from the piston head along the inclined wall 15 of the groove, thus causing the outer surface 23 to be forced against the cylinder wall. The greater the pressure on the surface 21 of the ring, the greater will be the pressure outward, of the surface 23, against the cylinder wall. As the pressure decreases on the surface 21 and the need for outward pressure against the cylinder wall decreases, the less will be this pressure of the surface 23 against the cylinder wall. This holding of the proper pressure between the ring and cylinder wall causes the oil to be held between the surfaces thus permitting proper lubrication and preventing the collapse of the ring inward, the blowing out of the oil and the consequent metal on metal friction which actions take place in the operation of the ordinary type of rectangular ring.

The ring is preferably made having a greater radial thickness than axial thickness.

The ring preferably has sufficient spring tension to be held outwardly against the wall of the cylinder, but this is not depended upon entirely to cause the tight seal between the piston and cylinder since as above described the pressure from the cylinder itself performs the greater part of this function.

While I have described a preferred form of my invention I desire to have it understood that I do not limit myself to the exact showing and that modifications and changes can be made without departing from the spirit of my invention and within the scope of the appended claims.

Having described my invention, what I claim and desire to secure by Letters Patent is:

1. In combination, a piston having a groove adjacent its end, and a ring in the groove, the groove having a narrow inclined conical wall inclining outwardly and toward the surface of the piston adjacent its head which is exposed to the pressure at the end thereof, a conical wall inclined oppositely to the narrow inclined conical wall of the groove, the ring having two conical surfaces for contact and cooperation with the conical walls of the groove.

2. In combination, a piston having a groove adjacent its end, and a ring in the groove, the groove having a narrow inclined conical wall inclining outwardly and toward the surface of the piston adjacent its head which is exposed to the pressure at the end thereof, a conical wall inclined oppositely to the narrow inclined conical wall of the groove, the ring having two conical surfaces for contact and cooperation with the conical walls of the groove, the ring having a greater radial thickness than axial thickness.

3. In combination, a piston having a groove adjacent its end, the piston head being cut away between the head and the groove, and a ring in the groove, the groove having a narrow inclined conical wall inclining outwardly and toward the surface of the piston adjacent its head which is exposed to the pressure at the end thereof, a conical wall inclined oppositely to the narrow inclined conical wall of the groove, the ring having two conical surfaces for contact and cooperation with the conical walls of the groove.

4. In combination, a piston having a groove adjacent its end, and a ring in the groove, the groove having a narrow inclined conical wall inclining outwardly and toward the surface of the piston adjacent its head which is exposed to the pressure at the end thereof, a conical wall inclined oppositely to the narrow inclined conical wall of the groove, the ring having two conical surfaces for contact and cooperation with the conical walls of the groove, the ring having a face toward the adjacent end of the piston and lying substantially in a plane.

5. In combination, a piston having a groove adjacent its end, the piston head being cut away between the head and the groove, and a ring in the groove, the groove having a narrow inclined conical wall inclining outwardly and toward the surface of the piston adjacent its head which is exposed to the pressure at the end thereof, a conical wall inclined oppositely to the narrow inclined conical wall of the groove, the ring having two conical surfaces for contact and cooperation with the conical walls of the groove, the ring having a face toward the adjacent end of the piston and lying substantially in a plane.

In testimony whereof I hereunto affix my signature.

HARRY B. JOHNSTON.